TRANSMISSION LINE COUPLED TUNNEL DIODE PULSE GENERATOR

Filed July 17, 1967

FREDERICK Y. KAWABATA
*INVENTOR*
*BY*
*BUCKHORN, BLORE, KLARQUIST & SPARKMAN*
*ATTORNEYS*

United States Patent Office 3,510,690

Patented May 5, 1970

3,510,690

TRANSMISSION LINE COUPLED TUNNEL DIODE PULSE GENERATOR

Frederick Y. Kawabata, Beaverton, Oreg., assignor to Tektronix, Inc., Beaverton, Oreg., a corporation of Oregon Filed July 17, 1967, Ser. No. 653,743

Int. Cl. H03k *17/58*

U.S. Cl. 307—258 11 Claims

ABSTRACT OF THE DISCLOSURE

A tunnel diode is located in series with the central inner conductor of a coaxial transmission line, with one end of the transmission line providing an output terminal and the opposite end of the transmission line being terminated in its characteristic impedance. The transmission line provides a substantially constant and predictable load for the tunnel diode so as to minimize output aberrations. Balanced drive means for the tunnel diode are disposed adjacent the diode, and comprise capacitive probes extending proximate the transmission line inner conductor immediately adjacent either side of the tunnel diode. A balanced drive is supplied to the probe so that the drive current flows between the probes and does not appear elsewhere in the transmission line.

Background of the invention

A tunnel diode is capable of generating voltage steps with rise times on the order of tens of picoseconds. However, the output of a pulse generator utilizing a tunnel diode frequently exhibits undesirable aberrations as a result of the tunnel diode triggering arrangement. A triggering pulse for the diode is normally applied in a system having imperfect resistive and reactive properties causing such aberrations and supplying an output pulse which is not truly representative of the sharp-pulse capabilities of the tunnel diode.

Summary of the invention

According to the present invention, a tunnel diode is serially interposed in a transmission line such that the tunnel diode is presented with a resistive load provided by the transmission line on either side of the diode, this load being constant and predictable. In order to trigger the tunnel diode, balanced drive means are coupled to the transmission line adjacent and on either side of the tunnel diode. According to one embodiment, the balanced drive means comprise capacitive probes coupled to the inner conductor of the transmission line, and the inner conductor serially supports the tunnel diode. Balanced drive pulses applied to the probes provide a triggering current which passes through the tunnel diode but which produces a minimum effect at the output of the transmission line.

Bias circuit means are suitably connected to the tunnel diode via the inner conductor of the transmission line conductor in which the tunnel diode is serially inserted, and act to prove a D.C. bias current through the tunnel diode so that trigger pulses of minimum magnitude may be used to trigger the tunnel diode. According to one embodiment of the invention, a snap-off diode is coupled to the balanced drive means for the tunnel diode for providing the trigger pulses thereto.

It is accordingly an object of the present invention to provide an improved pulse generator for providing a sharp voltage step having a rise time on the order of tens of picoseconds.

It is another object of the present invention to provide an improved tunnel diode pulse generator wherein the output is subject to minimized triggering aberration.

It is a further object of the present invention to provide an improved tunnel diode pulse generator wherein the tunnel diode is coupled to a constant transmission line load and provided with drive means effective for minimizing the effect of triggering input upon the output of the pulse generator.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

Drawings

Detailed description

Figure 1:
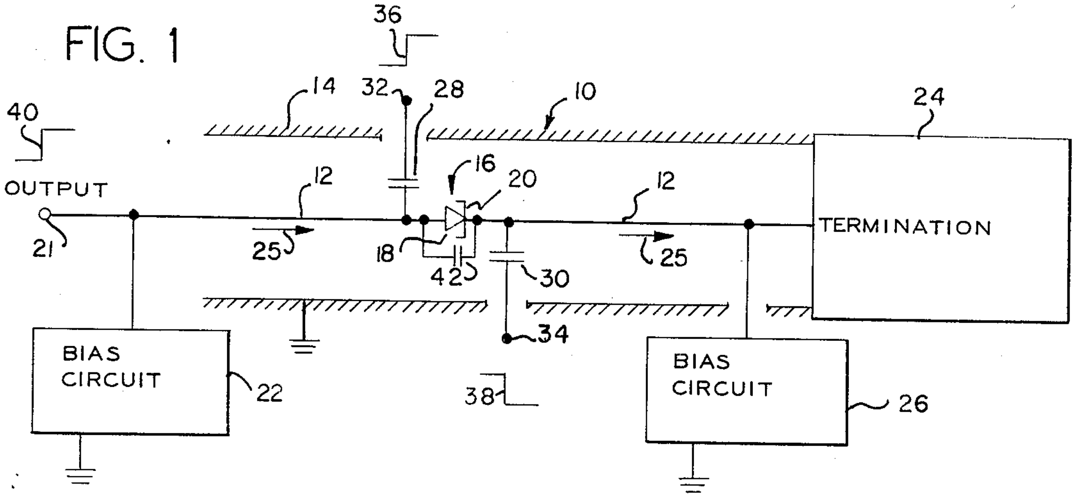
FIG. 1 is a schematic diagram of a pulse generator according to the present invention.

Referring to the drawings, and particularly FIG. 1, a pulse generator according to the present invention includes a transmission line preferably taking the form of coaxial transmission line 10 having an inner conductor 12 and a concentric outer conductor 14 within which the inner conductor is supported. The transmission line suitably has a characteristic impedance of 50 ohms and a length of 20 to 30 centimeters although these features are not critical. A tunnel diode 16 is serially disposed with respect to and supported by the inner conductor of the transmission line and is suitably located at about mid-point of the transmission line so as to divide the transmission line into an output section to the left of the tunnel diode 16 in the drawing and a termination of section to the right of the tunnel diode in the drawing. The inner conductor 12 of the output section is suitably joined to anode 18 of the tunnel diode while inner conductor 12 of the termination section is suitably joined to cathode 20 of the tunnel diode. The transmission line provides the desired constant load for the tunnel diode.

Figure 2:
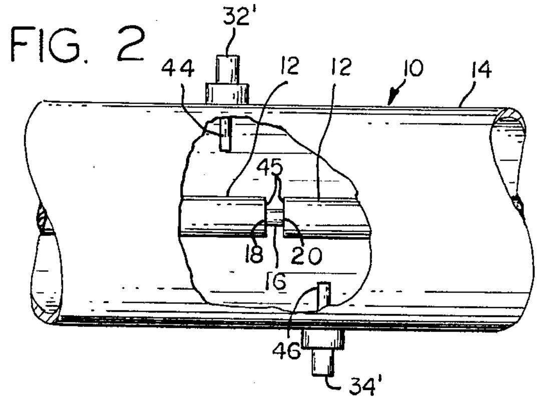
FIG. 2 is an elevational view, partially cut away, illustrating a transmission line section of the pulse generator according to the present invention.

A preferred physical construction for the transmission line is illustrated in greater detail in FIG. 2, more clearly showing the support of tunnel diode 16 by the inner conductor of the transmission line. The tunnel diode is thus suitably supported between the inner conductors 12 at either end of tunnel diode, the inner conductor being centered within outer conductor 14 by means of usual spacer means (not shown) located at intervals along the transmission line.

Returning to FIG. 1, the inner conductor 12 of the output section of the transmission line is connected to output terminal 21, and may also be connected to a desirably high impedance bias circuit means 22 at this point, although the location where the bias circuit means is connected to the inner conductor of the output section of the transmission line is not of great importance. The termination section of the transmission line is suitably coupled to a termination 24 having substantially the same impedance as the characteristic impedance of the transmission line, here 50 ohms. Bias circuit means 26 is also coupled to the inner conductor 12 of the transmission line termination section at this point, and suitably has no loading effect upon the transmission line, or at least in conjunction with termination 24 provides the aforementioned characteristic impedance. The bias circuit means and outer conductor 14 of the transmission line have a common ground as shown.

The bias circuit means 22–26 is arranged to provide one substantially constant D.C. current 25 through inner conductor 12 and through the tunnel diode 16 near but below the peak current of the tunnel diode. Therefore the tunnel diode is maintained near the point at which it may be switched from its low voltage state to its high voltage state.

The tunnel diode arranged in this manner presents a drive problem in that it is desired to trigger the tunnel diode so as to prevent transmission of the drive signal itself down the transmission line. In accordance with the present invention the tunnel diode is triggered employing balanced drive means coupled to the tunnel diode immediately adjacent either terminal thereof. In FIG. 1, capacitors 28 and 30 are represented as connected between drive terminals 32 and 34, respectively, and the inner conductor 12 of the transmission line proximate either side of the tunnel diode. Thus, capacitor 28 is coupled to the transmission line output section inner conductor 12 proximate where the output section inner conductor 12 joins anode 18. Similarly, capacitor 30 is coupled to termination section inner conductor 12 substantially where the termination section inner conductor joins cathode 20. For the purpose of triggering the tunnel diode from its low voltage condition to its high voltage condition, a pair of drive pulses, balanced with respect to ground, is applied to terminals 32 and 34.

The tunnel diode is adapted to initially reside in its low voltage state. A positive voltage triggering pulse 36 is applied to terminal 32 coupled to anode 18 while a substantially simultaneously occurring negative voltage triggering pulse 38 of equal magnitude is applied to terminal 34 coupled to cathode 20. The application of pulses 36 and 38 causes current to flow through diode 16 which, in addition to current 25, is sufficient for switching the tunnel diode. However, since pulses 36 and 38 are balanced and of opposite polarity, they tend to cancel one another insofar as a transmission line load at the output terminal 21 is concerned. The additional current for triggering the diode flows from terminal 32 through the tunnel diode and out terminal 34 without such additional current flowing elsewhere in the transmission line. The impedance of the output and termination sections of the transmission line across which pulses 36 and 38 respectively appear is the same, and the input and output sections are, of course, only separated by tunnel diode 16. Therefore, the effect of pulses 36 and 38 on the transmission line output is substantially minimized, the pulses 36 and 38 tending to cancel.

The concurrent application of pulses 36 and 38 switches the tunnel diode to its high voltage state. As a result a positive pulse is propagated from tunnel diode 16 towards output terminal 21 which is seen as output step 40 at terminal 21, with respect to ground. At the same time, a negative going pulse is propagated down the transmission line towards termination 24. Providing the termination is of the proper value as hereinbefore described, such negative going pulse will be absorbed. The output voltage step 40 is very fast and can have a rise time on the order of tens of picoseconds, and may be employed, for example, for testing and accurately timing fast operating pulse equipment or for accurately timing short duration occurrences.

The load upon tunnel diode 16 comprises the parallel combination of capacitance 42 and an impedance which is twice the value of the characteristic impedance of the transmission line. The latter impedance, of course, comprises that of the output and termination sections of the transmission line. Capacitance 42 is equal to the capacitance between the two surfaces 45 of inner conductor 12 where they join tunnel diode 16. (See FIG. 2.) The effect of the capacitance 42 is small and can be accounted for, for example, by adding it to the junction capacitance of the tunnel diode. When the tunnel diode switches in this environment, the load in parallel with the tunnel diode is substantially constant and resistive and principally comprises the resistive impedance of the transmission line sections. The voltage step output 40 produced by the tunnel diode as disposed in the generator according to the present invention therefore can be produced with minimized aberration, and is quite sharp and flat without substantial overshoot or the like.

According to an embodiment of the present invention, the balanced drive means, represented by capacitors 28 and 30 in FIG. 1, comprises a pair of probes 44 and 46 extending through and insulated from outer conductor 14 of the coaxial line in FIG. 2. The locations of the probes are offset along the line so that probe 44 has more capacitive coupling to the inner conductor 12 attached to tunnel diode anode 18, while probe 46 has more capacitive coupling to the inner conductor attached to tunnel diode cathode 20. The probes (however, are not in physical contact with the inner conductor, but rely on their proximity to the inner conductor for capacitive coupling. The probes should be as near to the tunnel diode on either side thereof as possible, consonant with the aforementioned desired differential capacitive coupling to the tunnel diode terminals, whereby the opposite polarity drive pulses will appear to be applied at nearly the same location with respect to the overall transmission line. Therefore, it is desired the probes be positioned axially quite closely adjacent the tunnel diode. As hereinbefore described, the opposite polarity pulses 36 and 38 are substantially simultaneously applied to such balanced drive means and are suitably connected to terminals 32' and 34' conductively connected to the probes. Being of opposite polarity and substantially equal in magnitude, these pulses tend to cancel so far as the transmission line is concerned. Only a portion of the transmission line 10 is illustrated in FIG. 2, it being understood that the complete line has a greater length than the portion shown.

Figure 3:
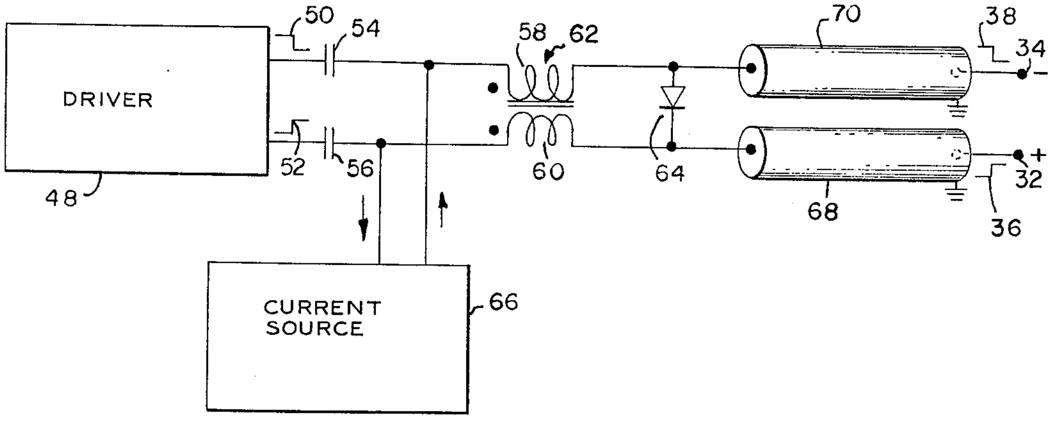
FIG. 3 is a schematic diagram of a triggering circuit of pulse generator according to the present invention.

FIG. 3 illustrates means for applying the drive pulses of equal and opposite polarity to the aforementioned balanced drive means of the transmission line. Such means for applying the drive pulses comprises a driver 48 for supplying positive and negative pulses 50 and 52 respectively at output terminals thereof. Driver 48 suitably employs an avalanche transistor connected in a balanced circuit for supplying reasonably rapid and balanced opposite polarity and equal magnitude pulses 50 and 52 through capacitors 54 and 56 respectively to the windings 58 and 60 of a balancing transformer 62. The opposite ends of these windings are connected to the terminals of a snap-off diode 64. A current source 66 is also connected to the windings 58 and 60 so as normally to provide a current through snap-off diode 64. When driver 48 produces output pulses 50 and 52, the charge of the snap-off diode is removed, and a fast rising transition to the "off" state takes place at the terminals of snap-off diode 64.

The voltage across the snap-off diode does not follow the voltage of pulses 50 and 52 due to the storage of minority current carriers which have been injected through the diode junction during the normal forward bias condition, i.e. as current is supplied from source 66. Rather, there is a time delay between application of pulses 50 and 52, which reverse bias the snap-off diode, and the resultant increase in voltage drop across such diode. However, after the stored charge of minority carriers has reduced sufficiently, the voltage across the diode increases at a rapid rate to produce an output voltage pulse which has a much faster rise time than driver pulses 50 and 52, i.e. the snap-off diode transition takes place in a time on the order of 200 picoseconds. The fast step across snap-off diode 64 is coupled to the tunnel diode by a pair of equal electric length transmission line sections 68 and 70 connected respectively to the aforementioned terminals 32 and 34. By virtue of the symmetry of the circuit, the pulses 36 and 38 produced are of equal amplitude. The balancing transformer 62 insures that the drive to the snap-off diode is well balanced so as to produce the desired equal amplitude pulses. Inasmuch as drive pulses 50 and 52 are supplied at the same time, then pulses 36 and 38 applied to terminals 32 and 34 also occur substantially simultaneously.

The means for applying the drive pulses including the snap-off diode is advantageously employed in the pulse generator according to the present invention inasmuch as the output of the snap-off diode is itself quite sharp, even though not as sharp as the operation of the tunnel diode itself by at least an order of magnitude. Nevertheless, the fast-operating driving means including the snap-off diode tends to remove jitter from the operation of tunnel diode 16 thereby insuring an accurately timed output step 40 at output terminal 21. After the production of the output step 40 at output terminal 21, the tunnel diode may be reset to its low voltage state by temporarily discontinuing or substantially lowering the current 25 supplied by bias circuit means 22–26, as will be understood by those skilled in the art.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A pulse generator comprising:

a transmission line having a tunnel diode coupled in series therewith, said transmission line including a first transmission line section connected to an anode terminal of said tunnel diode, and a second transmission line section connected to a cathode of said tunnel diode.

an output terminal coupled to said tunnel diode by one of said transmission line sections disposed between a terminal of said tunnel diode and said output terminal, balanced drive means coupled to said transmission line adjacent said tunnel diode, one such drive means being coupled to the transmission line section connected to said anode terminal and another of said drive means being coupled to the transmission line section connected to said cathode terminal, a means for applying a pair of opposite polarity pulses to such balanced drive means for causing a triggering current to flow through said tunnel diode between said balanced drive means.

2. The generator according to claim 1 wherein said opposite polarity pulses applied are substantially equal in magnitude and substantially coincident in time.

3. The generator according to claim 1 further including bias circuit means connected to said tunnel diode via the sections of said transmission line connected to the terminals of said diode for normally providing a substantially constant current to said diode near but below the peak current of said tunnel diode.

4. The generator according to claim 1 wherein said transmission line is coaxial comprising concentrically disposed inner and outer conductors, the tunnel diode being supported in series with the inner conductor between said transmission line section.

5. The generator according to claim 1 wherein said transmission line is provided with a termination sub stantially matching the characteristic impedance of said transmission line and terminating the transmission line section remote from the transmission line section coupled to said output terminal.

6. The generator according to claim 4 including bias circuit means connected to the transmission line section inner conductor on either side of said tunnel diode.

7. The generator according to claim 6 wherein said bias circuit means comprises current source means for providing a substantially constant D.C. current to said tunnel diode near the peak current value for said tunnel diode.

8. The generator according to claim 4 wherein said balanced drive means comprise probes extending through and insulated from the outer conductor and spaced from the inner conductor on either side of said tunnel diode while being substantially immediately adjacent said tunnel diode in order to provide capacitive drive coupling to said tunnel diode via the said inner conductor.

9. The generator according to claim 1 wherein said means for applying drive pulses includes a snap-off diode having its terminals coupled respectively to said balanced drive means.

10. The generator according to claim 9 wherein said means for applying drive pulses further includes a current source for said snap-off diode and a driver circuit for said snap-off diode coupled to the terminals of said current source, and a balancing transformer having a pair of mutually coupled windings for respectively connecting the terminals of said current source to the terminals of said-off diode.

11. The generator according to claim 9 further including third and fourth transmission line sections coupling the terminals of said snap-off diode respectively to the balanced drive means.

References Cited

UNITED STATES PATENTS

| | | | |
|---|---|---|---|
| 3,098,973 | 7/1963 | Wickersham et al. ---- | 307—322 |
| 3,450,902 | 6/1969 | Grove -------------- | 307—258 |

STANLEY D. MILLER, Primary Examiner

B. P. DAVIS, Assistant Examiner

U.S. Cl. X.R.

307—260, 286, 322; 333—7

PO-1050
(5/69)

UNITED STATES PATENT OFFICE
CERTIFICATE OF CORRECTION

Patent No. 3,510,690 Dated May 5, 1970

Inventor(s) FREDERICK Y. KAWABATA

It is certified that error appears in the above-identified patent and that said Letters Patent are hereby corrected as shown below:

Column 2, line 42, after "termination" delete "of".

Column 4, line 20, change the parenthesis "(" to a comma --,--.

Column 5, line 37, after "cathode", insert --terminal--; line 49, (at the beginning of the line) change "a" to --and--.

Column 6, line 8, "section" should be --sections--; line 10, "sub stan'" should be --substan--; line 41, "said-off" should be --said snap-off--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents